3,304,201
ACYLOXY ENDBLOCKED ROOM TEMPERATURE VULCANIZABLE SILOXANE RUBBER FOR WIRE COATING
Arthur Bruce Boehm, Jr., Moorestown, N.J., assignor to Dow Corning Corporation, Midland, Mich., a corporation of Michigan
No Drawing. Filed Apr. 8, 1963, Ser. No. 271,495
6 Claims. (Cl. 117—232)

This invention relates to a new braid saturant and to a process for curing the braid saturant.

In the process of insulating and coating of wires, rods, conductors, etc., it is a common practice to first coat such materials with an insulation of rubber and then place a sleeve of fiber braiding, for example, fiberglass braid, over the insulation. The braid is then saturated with a resin which forms a relatively hard outer coating. Such coatings, however, have not been completely satisfactory since they are subject to damage, especially when they are bent.

It is an object of this invention to provide a new braid saturant which gives a stronger, more flexible coating than those known heretofore and which is not as subject to damage as the heretofore known materials.

It is a further object of this invention to provide a process by which the braid saturant can be cured.

It has been found that by using a room temperature vulcanizable rubber as the braid saturant, a coating is obtained that is stronger, more flexible and less subject to damage than the coatings known heretofore.

The room temperature vulcanizable rubbers that are particularly useful as braid saturants in the process of this invention are the acetoxy endblocked siloxanes.

The term "endblocked" is also intended to include materials which contain some of the specified groups along the chain since it is well known by those skilled in the art that while all of the groups can be on the end of the chain, often times such is not the case. Illustrative of these materials and their method of preparation are the acyloxy endblocked room temperature vulcanizable rubbers disclosed in U.S. Patent 3,035,016 to Bruner, the disclosure of which is incorporated herein by reference. It is reiterated that the room temperature vulcanizable rubbers disclosed in the above patent, i.e., acyloxy endblocked siloxanes, are illustrative only of such rubbers that can be used and the invention is not limited to the acyloxy endblocked silanes specifically disclosed in the above patent.

The means by which the room temperature vulcanizable rubber is applied to the braid is not critical. For example, it can be applied to the braid by rubbing or brushing it on or it can be applied to the braid as the braid containing object passes through a die. Many other means will no doubt be obvious to those skilled in the art for applying the braid saturant.

While the room temperature vulcanizable rubber used as a braid saturant will cure merely by exposure to the atmosphere, it has now also been found that by contacting it with an aqueous solution of ammonia the rate at which it cures can be greatly accelerated. This is of particular significance where mass production in an assembly line is involved.

The means used for contacting the room temperature vulcanizable rubber with the aqueous ammonia solution is not critical. For example, the aqueous ammonia solution can be brushed or sprayed onto the rubber. Another, and the preferred, means of contacting the rubber with the aqueous ammonia solution is to pass the object containing the braid saturated with the rubber through a bath of the aqueous ammonia. Other means of contacting the rubber and aqueous ammonia will be obvious to those skilled in the art.

After the rubber has been contacted with the aqueous ammonia solution it can be air dried or passed through an oven to remove any liquid which may remain on the surface, if so desired.

The concentration of the aqueous ammonia solution employed is not particularly critical. Relatively dilute or concentrated solutions can be used. An example of a suitable solution is ordinary reagent grade ammonium hydroxide which contains about 28 percent ammonia. It is obvious, of course, that extremely dilute solutions, while useful, are not very practical.

In order that those skilled in the art may better understand how the present invention may be practiced, the following examples are given by way of illustration and not by way of limitation.

*Example 1*

An acetoxy endblocked room temperature vulcanizable siloxane rubber was smeared onto the glass braid which covered a rubber insulated wire. The braid was then dipped into a 15 percent aqueous ammonium hydroxide solution. This accelerated the cure of the rubber. The resultant coating was more flexible and less subject to damage than heretofore known materials.

*Example 2*

When reagent grade ammonium hydroxide is substituted for the aqueous ammonia solution of Example 1, equivalent results are obtained.

*Example 3*

When a formyloxy, hexoyloxy or octanoyloxy endblocked siloxane rubber is substituted for the acetoxy endblocked siloxane of Example 1, similar results are obtained.

That which is claimed is:

1. In the process of insulating and coating wires, rods, conductors and the like materials wherein a saturated fiber braid is used as part of the insulation and coating, the improvement comprising employing an acyloxy endblocked room temperature vulcanizable siloxane rubber as the braid saturant.

2. The process of claim 1 wherein the rubber is an acetoxy endblocked siloxane.

3. In the process of insulating and coating wires, rods, conductors and the like materials wherein a saturated fiber braid is used as part of the insulation and coating, the improvements comprising employing an acyloxy endblocked room temperature vulcanizable siloxane rubber as the braid saturant and accelerating the cure of the rubber by contacting it with an aqueous solution of ammonia.

4. The process of claim 3 wherein the rubber is an acetoxy endblocked siloxane.

5. The process of claim 3 wherein the rubber is contacted with the aqueous solution of ammonia by passing it through a bath of the aqueous ammonia.

6. The process of claim 4 wherein the rubber is contacted with the aqueous solution of ammonia by passing it through a bath of the aqueous ammonia.

References Cited by the Examiner

UNITED STATES PATENTS

| | | | |
|---|---|---|---|
| 3,046,293 | 7/1962 | Pike | 260—46.5 X |
| 3,067,081 | 12/1962 | Betzhold et al. | 117—232 X |
| 3,133,891 | 5/1964 | Ceyzeriat | 260—46.5 |

FOREIGN PATENTS

| | | |
|---|---|---|
| 867,066 | 5/1961 | Great Britain. |
| 911,887 | 11/1962 | Great Britain. |
| 913,295 | 12/1962 | Great Britain. |

ALFRED L. LEAVITT, *Primary Examiner.*

WILLIAM L. JARVIS, *Examiner.*